April 23, 1940.  J. V. CAPUTO  2,198,264

APPARATUS FOR WELDING

Filed Aug. 7, 1933  3 Sheets-Sheet 1

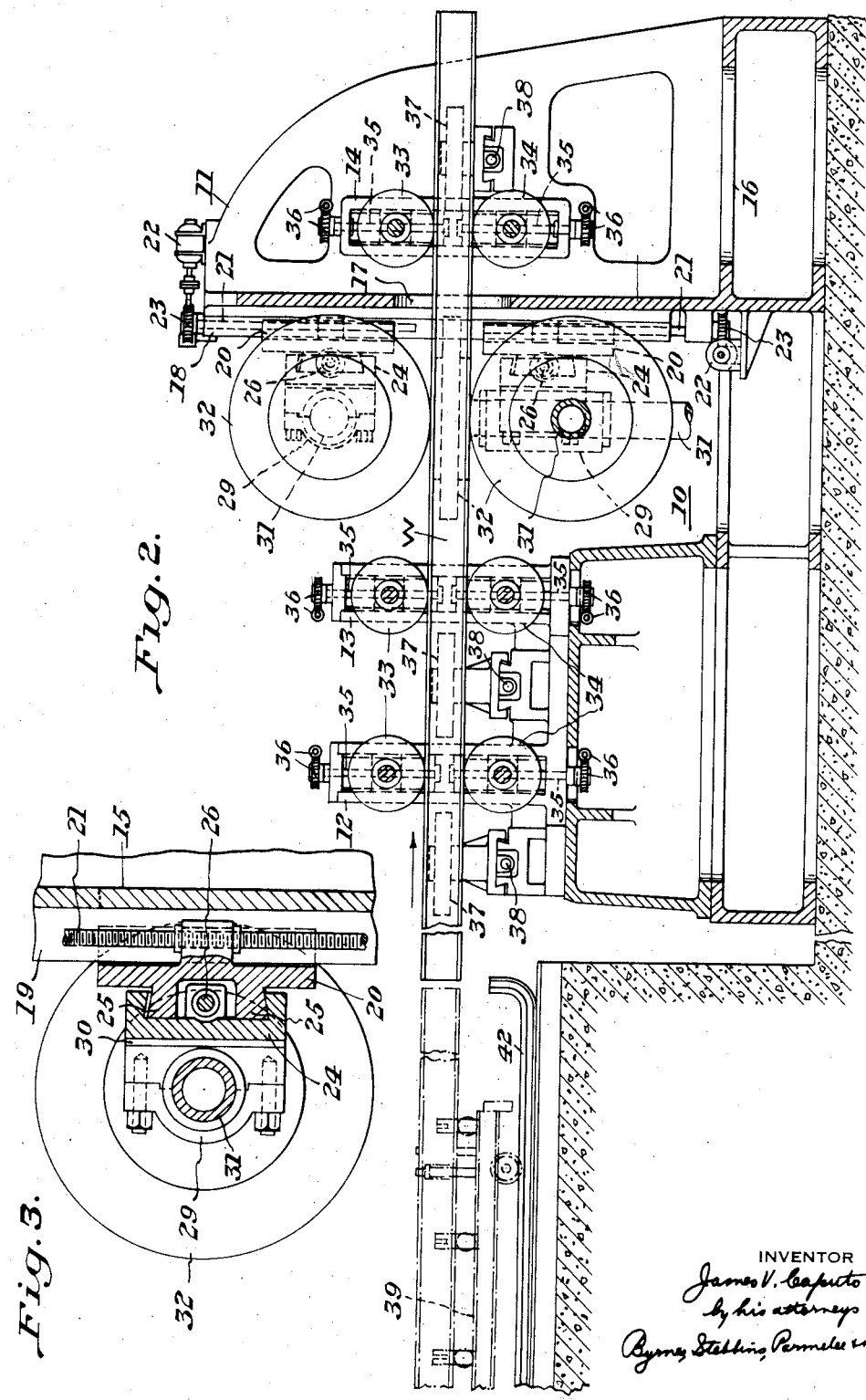

April 23, 1940.  J. V. CAPUTO  2,198,264
APPARATUS FOR WELDING
Filed Aug. 7, 1933   3 Sheets-Sheet 3
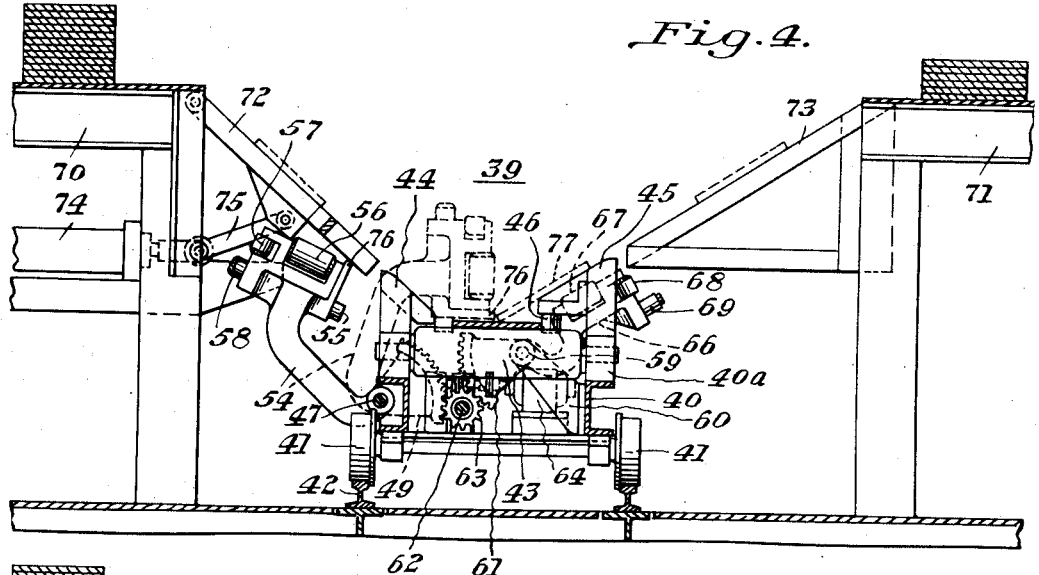
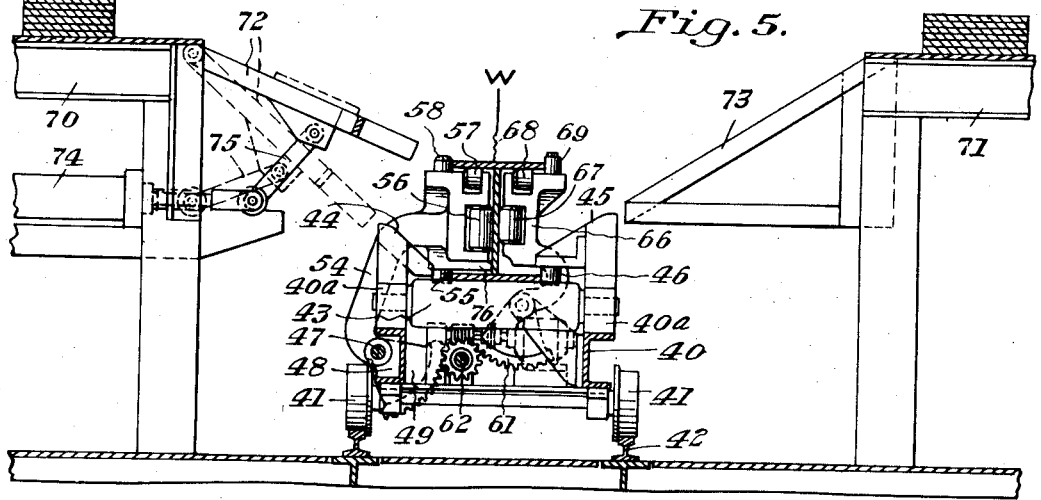
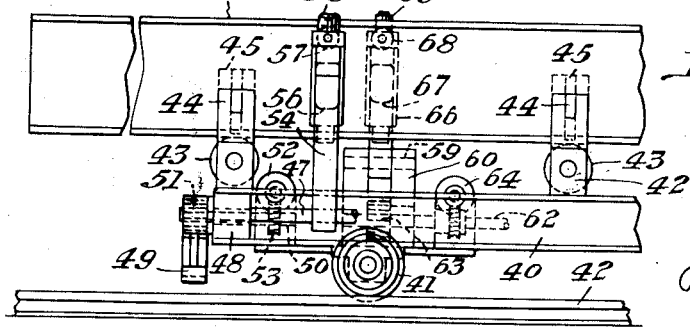
INVENTOR
James V. Caputo
by his attorneys Patented Apr. 23, 1940

2,198,264

UNITED STATES PATENT OFFICE 2,198,264

APPARATUS FOR WELDING

James V. Caputo, Girard, Ohio

Application August 7, 1933, Serial No. 683,921

16 Claims. (Cl. 219—4)

My invention relates to the art of welding and, in particular, to the welding of structural shapes from members of simple section, such as flat plates.

It has been proposed heretofore to take advantage of the economy characterizing the process of electric welding, in the manufacture of structural shapes from plates but, insofar as I am aware, no method or apparatus has been devised which is capable of satisfactorily manufacturing shapes by welding, on a commercial scale. I have invented a method and apparatus for electrically welding flat plates to form the standard structural shapes according to which the plates are first positioned properly relative one to another, and then subjected to a continuous high speed weld with the result that a commercially salable product may be manufactured very rapidly and very cheaply.

While the invention may take numerous forms, I have illustrated in the accompanying drawings a present preferred embodiment, although the invention is not limited thereto. For the purpose of illustration only, I have shown the invention embodied in a machine for welding I-beams, although it will be understood that the invention can be adapted for the manufacture of other structural shapes without material change. In the drawings:

Figure 2 is a sectional view along the line II—II of Figure 1 showing the electrode rolls in side elevation, as well as guide and feeding rolls and pressure rolls for completing the weld;

Figure 3 is a partial sectional view along the line III—III of Figure 1;

Figure 4 is a transverse sectional view through the apparatus for receiving the metal plates and arranging them in proper relation preparatory to the welding operation;

Figure 5 is a view similar to Figure 4 showing the parts in a different position; and Figure 6 is a partial side elevation of the structure shown in Figures 4 and 5.

Figure 1:
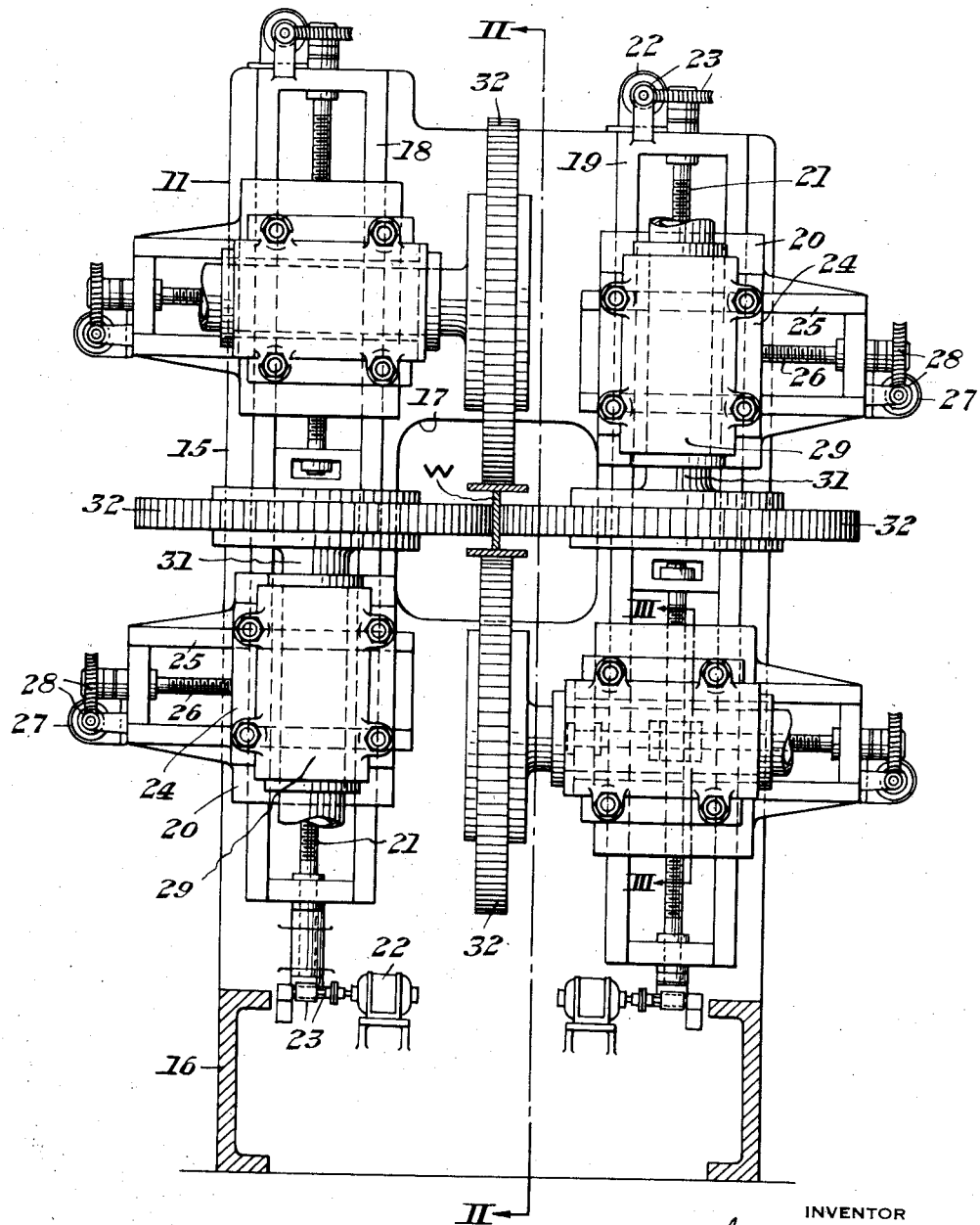
Figure 1 is an end elevation of a stand of electrode or contact rolls which engage the work for supplying welding current thereto.

Referring now in detail to the drawings and, for the present, to Figures 1 through 3, I provide a welder 10 comprising a stand 11 of electrode rolls, stands 12 and 13 of feeding and guiding rolls, and a stand 14 of pressure rolls. As shown in Figure 2, the pressure rolls may conveniently be carried on the structure which supports the electrode rolls.

The electrode roll stand comprises a housing 15 supported on a suitable base 16. The housing has a window 17 for the passage of the work therethrough. On opposite sides of the window 17, ways 18 and 19 are formed adjacent the sides of the housing. Carriages 20 are slidable in the ways 19. Screws 21 driven by motors 22 through gearing 23, permit the adjustment of the carriages 20 vertically. Bearing blocks 24 are movable transversely of the carriages 20 on ways 25 to which the blocks are dovetailed. Adjusting screws 26, driving motors 27 and connecting gearing 28 therefor are provided to permit transverse movement of the bearing blocks.

Each of the bearing blocks 24 carries a bearing 29. The bearings are insulated from the blocks by a layer 30 of insulating material (see Figure 3). Shafts 31 are journaled in the bearings 29. Disc electrodes 32 are secured to the inner ends of the shafts 31 for making contact with the work and supplying electric current thereto.

The welding current may be generated and supplied in any convenient manner but I prefer to employ the apparatus described and claimed in my copending application, Serial No. 678,425, filed June 30, 1933, for Control system for electric welders, since matured into Patent No. 2,052,965, dated September 1, 1936. For the purposes of this description, however, it may be assumed that the required welding current is supplied to the electrode discs 32 through the shafts 31 by means of ordinary brushes and slip rings. Since the bearings supporting the shafts 31 are insulated from the adjustable blocks on which the bearings are carried, there is no chance for stray currents to flow through the supporting structure. It will be observed in Figure 1 that the shafts 31, which are in diagonally opposite positions on the housing 11, are parallel, while adjacent shafts are at right angles. This relation of the shafts positions the discs 32 for proper engagement with the work W typified in the particular example illustrated by an I-beam. It will be apparent from the foregoing description, however, that the positions of the electrode discs may be changed by means of the vertical and transverse adjusting screws to accommodate any other shapes, such as a channel, angle, T or Z. The feeding and guiding stands 12 and 13 and the welding stand 14 are similar in construction. Each stand includes adjustable top and bottom rolls 33 and 34. The adjusting screws for the rolls are shown at 35 and the driving gears therefor at 36. Any type of motive power, of course, may be employed to actuate the driving gears.

Electric motors suitably positioned will preferably be employed.

For each stand of horizontal rolls, such as that just described, a corresponding stand of vertical rolls 37 is provided. The rolls 37 are adjustable laterally by means of screws 38 suitably driven. It will be apparent that the feeding and guiding rolls constitute means for rigidly supporting and directing the work into the pass between the electrode discs, and that the welding stand constitutes means for applying welding pressure to the members traversing the welder upon their emergence from the electrode discs.

Turning now to Figures 4 through 6, the apparatus for properly positioning the plates forming the shape being welded includes a carriage 39 having a frame 40 provided with wheels 41 adapted to travel on a track 42 parallel to the axis of the welder. Spaced along the length of the frame 40 are bearings 40a in which supporting rolls 43 are journaled. Extending upwardly from the bearings 42 are guides 44 and 45. A vertical guide roll 46 depends from each of the guides 45. A shaft 47 extends along one side of the frame 40 and is journalled in suitable bearings 48. A toothed segment 49 is keyed to the shaft 47 adjacent one end. A suitable shaft 50 journaled in suitable bearings carries a pinion 51 meshing with the segment 49. A motor 52 on the carriage 40 drives the shaft 50 through a worm and worm wheel 53.

At intervals along the shaft 47 are positioned bracket arms 54. At their outer ends, the bracket arms 54 carry guide rollers 55, 56, 57 and 58, the purpose of which will become apparent as the description proceeds.

A shaft 59 is journaled in bearing brackets 60 carried by the frame 40. A toothed segment 61 is keyed to the shaft. A shaft 62 has a pinion 63 meshing with the segment 61. A motor 64 drives the shaft 62 through a worm and worm wheel 65 so as to operate the segment 61. It will be apparent that the drive for the segment 61 is identical with that for the segment 49. The two drives are substantially co-axial and, for that reason, do not fully appear in Figures 4 and 5.

The shaft 62 is provided at intervals with bracket arms 66 keyed thereto, each arm having guide rolls 67, 68 and 69.

Tables 70 and 71, together with guides 72 and 73, are provided for storing the plates used in forming the webs and flanges of the shapes being welded, and for delivering them to the assembling apparatus. The guides 72 are hinged for swinging movement and a piston and cylinder 74 are connected to the guides 72 through a suitable linkage 75 to actuate the guides to the desired position.

Having described the structure contemplated in a preferred form of my invention, I shall now explain the operation thereof and a typical mode of practice of the invention.

The assembling apparatus shown in Figures 4 through 6 is initially in the position illustrated in Figure 4, between the tables 70 and 71, and with the bracket arms 54 and 66 retracted as shown. The guides 72, furthermore, are lowered so that they are substantially parallel to the guides 44 mounted on the frame 40. The first step in the assembling operation is the delivery of a plate from the table 70 to the supporting rolls 43 of the assembling apparatus. The plates forming the flanges of the shape being welded may conveniently be stacked on the table 70 and moved on to the guides 72 either manually or by a suitable power apparatus. Once started down the guide 72, the plate engages the guides 44 and rolls 43. The momentum of the moving plate is sufficient to cause it to strike the rolls 46 carried by the guides 45, which accurately aline the plate edges.

After the plate constituting the bottom flanges of the shape being welded has been positioned on the rolls 43, the guides 72 are raised to the position shown in Figure 5 by properly operating the piston and cylinder 74. The motor 52 is then started to shift the bracket arms 54 from the position of Figure 4 to the position of Figure 5 (also shown in dotted lines in Figure 4). In this movement of the bracket arms, the rolls 55 thereof engage the edge of the initially deposited plate opposite that engaged by the rolls 46 so that the plate is now firmly engaged at both edges and is thus accurately positioned.

The next operation is the movement of a plate from the table 71 down the guide 73. The plates on the table 71 are of suitable size to constitute the webs of the shapes being welded. The web plate slides down the guides 73 and the guides 45 on the frame 40 until its leading edge engages a stop finger 76 on each of the bracket arms 54. This position of the web plate is indicated in dotted lines at 77.

Operation of the motor 64 causes the bracket arms 66 to swing up into engagement with the web plate and shift it to vertical position with its lower edge resting on the bottom flange plate, as shown in Figure 5, the web plate being gripped and fixedly positioned between the rollers 56 and 67 on the bracket arms 54 and 66. It now remains only to deposit the top flange plate in proper relation to the web plate.

The guides 72 having been elevated to the position shown in Figure 5, another plate is fed downwardly over the guides. It will be observed that the upper ends of the rolls 58 and the left-hand ends of the rolls 57 and 68 are rounded to facilitate movement of the leading edge of the top flange plate thereover. The plate should normally slide to the final position illustrated in Figure 5, but if not, it can easily be shifted thereto by workmen with crowbars.

It will be obvious that the three plates constituting the various portions of the structural shape being welded are now properly positioned relative one to another for passage through the welder. To introduce the assembled plates into the guiding and feed rolls, I prefer to advance the assembling apparatus by any convenient drive, either a motor directly connected to the axles or by a cable connection and motor driven drum. The leading ends of the plates normally extend far enough beyond the end of the assembling apparatus to permit the plates to be engaged by the feed rolls before the traveling frame has reached its limit of movement. Under such conditions, the assembled plates are seized by the feeding and guiding rolls which are driven by any convenient means, not shown, and are advanced in proper relation for welding until they engage the electrode discs 32.

Since it is necessary to weld two seams to form an I-beam from three plates, I so connect the electrode 32 to their current source that the horizontally disposed discs will have one steady or instantaneous polarity depending on whether direct or alternating current is employed for welding, and the vertically disposed discs have the opposite polarity. With this arrangement, obviously, welding current flows into the web plate from both exposed sides thereof, across the seams at the upper and lower edges thereof, and out of the flange plates, or vice versa.

The flow of current across the joints between the plates generates sufficient heat to raise the temperature of the plates adjacent the joint to welding temperature. The continued advance of the plates in assembled relation to and through the welding stand 14 results in the formation of a firm, continuous weld between the web and the flange plates. The welding stand is spaced from the electrodes sufficiently to permit the welding rolls 33 and 34 of the stand 14 to bend the flange plates on long gradual curves, to effect the slight upsetting necessary to complete the weld between the flange plates and the web. After passing through the stand of welding rolls, the completed shape may be discharged onto any suitable run-out table and subjected to the necessary finishing operations, such as flash trimming and cutting to length. The electrode discs and welding pressure rolls may be driven as are the feed and guiding rolls, or may be undriven, as desired.

It will be apparent from the foregoing description that the invention provides a method and apparatus for rapidly and cheaply forming structural shapes from flat plates. It is obvious that the cost of shapes produced in accordance with my invention will be much less than those rolled by conventional practice, because my invention eliminates the necessity for the large number of costly rolls heretofore employed for making various shapes. The invention is simple and is largely mechanical in character and the apparatus can be operated by relatively few workmen and a high production rate may be maintained. By accurately positioning the plates prior to welding, I insure a high degree of uniformity in the product. The adjustability of the various elements makes it possible to adapt the invention to the production of different sizes and shapes without material change in the apparatus. It is apparent that the construction shown may readily be altered to handle other shapes, such as channels, angles and the like.

Although I have described and illustrated herein but one preferred embodiment of the apparatus and one preferred practice of the method of my invention, it will be clear that many changes in the apparatus and method described may be made without departing from the spirit of the invention or the scope of the appended claims.

I claim:

1. A welder comprising a frame, a carriage slidable therein, ways on said carriage extending at an angle to the direction of movement of the carriage, a bearing block slidable on said ways, a shaft journaled in the bearing block, an electrode on said shaft, means for adjusting the carriage on the frame, and means for adjusting the bearing block and electrode on the carriage.

2. In an apparatus for welding substantially plate-like pieces to form structural shapes, the combination with means for supporting a piece, means for placing thereon a second piece, and holding it at a predetermined angle thereto, means for advancing the pieces while maintaining them in such relation, of means for supplying welding current to said pieces so that the joint therebetween is traversed by the current and heated to welding temperature, and means for applying welding pressure to said joint to complete the formation of the shape.

3. Apparatus for welding substantially plate-like pieces to form structural shapes having a web and a flange, comprising means for supporting a flange piece, means for placing a web piece thereon and holding it at a predetermined angle thereto, means for advancing the flange and web pieces in assembled relation, and means for conducting welding current to and from said pieces across the joint therebetween, and means for forming a welded joint between the pieces.

4. In an apparatus for welding substantially plate-like pieces to form structural shapes, a roll table for supporting a piece adapted to form a portion of said shape, means for delivering to a point adjacent the table a piece adapted to form another portion of said shape, means for placing the second piece on the first and holding it at a predetermined angle thereto, means for advancing the assembled pieces in such predetermined relation, and means for welding the pieces together to form a unitary shape.

5. Apparatus for welding structural shapes comprising a support, means for positioning a substantially plate-like piece deposited thereon, means for receiving and positioning at right angles thereto a second such piece deposited on the first, and means for progressively welding the meeting surfaces of said pieces as they move longitudinally relative to said support.

6. Apparatus for welding structural shapes comprising a support, guides on the support for positioning a substantially plate-like piece deposited thereon, means for setting a second such piece on the first and holding it at right angles thereto, and means for progressively welding the pieces while maintaining them in such relation.

7. In a welder, a support, means to position a substantially plate-like piece deposited thereon, arms pivoted adjacent the support for lifting a second piece deposited on the first to a prependicular relation therewith, and means for progressively welding the pieces while held in such relation.

8. Apparatus for welding structural shapes comprising a support, means to position a substantially plate-like piece deposited thereon, arms pivoted on both sides of the support for movement to a position over the support to set up and hold a second such piece on the first, and means for welding the pieces together progressively while so held.

9. Apparatus for welding flange and web plates to form structural shapes comprising a welding stand, electrodes for supplying welding current to the surfaces of said plates, said electrodes being rotatably mounted in a frame and adapted to be engaged by the plates as they move therepast, and a stand of welding rolls adapted to exert sufficient pressure on the assembled plates to effect a weld between their heated edges, said welding stand being spaced from the electrodes along the line of travel of the work therepast sufficiently to permit the flange plate to bend gradually as the heated abutting surfaces are upset and the weld completed.

10. In an apparatus for welding substantially plate-like pieces to form structural shapes, the combination with a carriage for supporting a piece, skids for depositing thereon a second piece, levers pivoted on the carriage for holding the second piece at a predetermined angle to the first, said carriage being movable to advance the pieces while maintaining them in such relation, of means for supplying welding current to said pieces so that the joint therebetween is traversed by the current and heated to welding temperature, and means for applying welding pressure to said joint to complete the formation of the shape.

11. The apparatus defined by claim 10 characterized by said levers having means for positioning a third piece on the second and supporting it at a predetermined angle thereto.

12. Apparatus for welding substantially plate-like pieces to form structural shapes having a web and a flange, comprising a carriage for supporting a flange piece, levers on the carriage for positioning a web piece at right angles to the web piece and holding it thereon, means on the levers for positioning a second flange piece on the web piece at right angles thereto, the carriage being movable to advance the flange and web pieces in assembled relation, and means for conducting welding current to and from said pieces across the joint therebetween, and means for forming a welded joint between the pieces.

13. Apparatus for welding structural shapes comprising a support, means for positioning a substantially plate-like piece deposited thereon, movable means for receiving and supporting at right angles thereto a second such piece deposited on the first, said second means also having means thereon for positioning a third piece at right angles to the second, said support being movable with said pieces supported thereon in assembled relation, and means for progressively welding the meeting surfaces of said pieces as they move.

14. Apparatus for welding structural shapes comprising a support, guides on the support for positioning a substantially plate-like piece deposited thereon, said guides having means for supporting a second such piece on the first and holding it at right angles thereto, said guides also having means for positioning a third piece on the second and holding it at right angles thereto, and means for progressively welding the pieces while maintaining them in such relation.

15. In a welding apparatus, a frame, a bottom carriage adjustably supported on said frame, a second carriage adjustable on said frame above said first-mentioned carriage, a disc electrode mounted in said bottom carriage for rotation in a vertical plane, and a disc electrode mounted in said second-mentioned carriage for rotation in a substantially horizontal plane.

16. In a welding apparatus, a frame, a carriage adjustable vertically of said frame and suspended from the upper portion thereof, a second carriage below the first-mentioned carriage, a disc electrode supported in the first-mentioned carriage in a substantially vertical plane, and a disc electrode mounted in said second-mentioned carriage for rotation in a substantially horizontal plane.

JAMES V. CAPUTO.